United States Patent
Diab

(10) Patent No.: US 8,930,534 B2
(45) Date of Patent: Jan. 6, 2015

(54) METHOD AND SYSTEM FOR MANAGEMENT BASED END-TO-END SLEEP LIMITATION IN AN ENERGY EFFICIENT ETHERNET NETWORK

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 76 days.

(21) Appl. No.: 12/535,172

(22) Filed: Aug. 4, 2009

(65) Prior Publication Data

US 2011/0022716 A1 Jan. 27, 2011

Related U.S. Application Data

(60) Provisional application No. 61/228,425, filed on Jul. 24, 2009.

(51) Int. Cl.
- *G06F 15/173* (2006.01)
- *G06F 15/16* (2006.01)
- *G06F 15/177* (2006.01)
- *H04L 12/12* (2006.01)

(52) U.S. Cl.
CPC ............. *H04L 12/12* (2013.01); *Y02B 60/32* (2013.01); *Y02B 60/34* (2013.01); *Y02B 60/35* (2013.01)
USPC ........... 709/225; 709/223; 709/224; 709/231; 709/232; 709/238; 709/220

(58) Field of Classification Search
USPC .................. 709/231, 223, 224, 225, 232, 238
See application file for complete search history.

(56) References Cited

U.S. PATENT DOCUMENTS

| 5,404,544 A * | 4/1995 | Crayford ................... 713/310 |
| 6,463,307 B1 * | 10/2002 | Larsson et al. ............ 455/574 |

(Continued)

FOREIGN PATENT DOCUMENTS

| CN | 1323495 A | 11/2001 |
| EP | 1158685 A1 | 11/2001 |

(Continued)

OTHER PUBLICATIONS

European Patent Office, Communication with European Search Report, in Application No. 10007246.1, dated Sep. 27, 2010.

(Continued)

*Primary Examiner* — Rupal Dharia
*Assistant Examiner* — Mohammed Ahmed
(74) *Attorney, Agent, or Firm* — Duane S. Kobayashi

(57) ABSTRACT

A time limit may be determined for energy efficient networking (EEN) sleep intervals based on end-to-end sleep interval limitations. The time limit may be communicated to other network devices which may limit their sleep time. End-to-end sleep interval limitation information may be received via a user input, packet header information, a standardized and/or non-standardized network management protocol, AVB, SRP, RSVP and SNMP. The EEN sleep interval time limit may be determined based on a number of hops between endpoint devices. Packets may be inspected to determine a packet data type and/or end-to-end sleep interval limitation information. The time limit may be determined based on latency requirements of data streams. A time limit for a port may be determined based on sleep time limits for data streams communicated via the port. The time limits may be statically and/or dynamically configured. The network device may be configured via a network management interface.

13 Claims, 6 Drawing Sheets

(56) References Cited

U.S. PATENT DOCUMENTS

| | | |
|---|---|---|
| 6,795,450 B1 | 9/2004 | Mills et al. |
| 6,848,059 B2 * | 1/2005 | Bullman et al. ............... 713/323 |
| 7,577,857 B1 * | 8/2009 | Henderson et al. ........... 713/320 |
| 2002/0162038 A1 * | 10/2002 | Bullman et al. ............... 713/323 |
| 2005/0009578 A1 | 1/2005 | Liu |
| 2005/0117530 A1 * | 6/2005 | Abraham et al. .............. 370/310 |
| 2006/0023739 A1 * | 2/2006 | Ishimura ........................ 370/463 |
| 2006/0034295 A1 | 2/2006 | Cherukuri et al. |
| 2007/0233835 A1 * | 10/2007 | Kushalnagar et al. ......... 709/223 |
| 2007/0280239 A1 | 12/2007 | Lund |
| 2008/0294917 A1 * | 11/2008 | Khan et al. .................... 713/310 |
| 2009/0077394 A1 | 3/2009 | Tsai, Jr. |
| 2009/0119524 A1 * | 5/2009 | Hays .............................. 713/322 |
| 2009/0135753 A1 * | 5/2009 | Veillette ......................... 370/311 |
| 2009/0300392 A1 * | 12/2009 | Henderson et al. ............ 713/323 |
| 2010/0067417 A1 * | 3/2010 | Zhou et al. ..................... 370/311 |
| 2011/0239014 A1 * | 9/2011 | Karnowski ..................... 713/320 |
| 2012/0082057 A1 * | 4/2012 | Welin et al. .................... 370/252 |

FOREIGN PATENT DOCUMENTS

| | | |
|---|---|---|
| WO | WO00/10353 A1 | 2/2000 |
| WO | WO02/15420 A2 | 2/2002 |

OTHER PUBLICATIONS

CN Office Action, Nov. 23, 2012.

* cited by examiner

METHOD AND SYSTEM FOR MANAGEMENT BASED END-TO-END SLEEP LIMITATION IN AN ENERGY EFFICIENT ETHERNET NETWORK

CROSS-REFERENCE TO RELATED APPLICATIONS/INCORPORATION BY REFERENCE

This application makes reference to, claims priority to, and claims the benefit of U.S. Provisional Application Ser. No. 61/228,425, filed on Jul. 24, 2009.

This patent application makes reference to:
U.S. patent application Ser. No. 12/571,208, which was filed on Sep. 30, 2009.
U.S. Patent Application Ser. No. 61/184,269, which was filed on Jun. 4, 2009;
U.S. patent application Ser. No. 11/963,017, which was filed on Dec. 21, 2007; and
U.S. patent application Ser. No. 11/963,087, which was filed on Dec. 21, 2007.

Each of the above stated applications is hereby incorporated herein by reference in its entirety.

FIELD OF THE INVENTION

Certain embodiments of the invention relate to communication systems. More specifically, certain embodiments of the invention relate to a method and system for a management based end-to-end sleep limitation in an energy efficient Ethernet network.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular. As an increasing number of portable and/or handheld devices are enabled for Ethernet communications, battery life may be a concern when communicating over Ethernet networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a method and system for a management based end-to-end sleep limitation in an energy efficient Ethernet network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for a management based end-to-end sleep limitation in an energy efficient Ethernet network. A network device may determine a time limit for an energy efficient networking sleep interval based on an end-to-end sleep interval limitation. The time limit may be communicated to one or more other network devices. The communicated time limit may limit an energy efficient networking sleep interval duration for the one or more other network devices. Information may be received by the network device based on the end-to-end sleep interval limitation via one or more of user input, packet header information and a network management protocol. Furthermore, information based on the end-to-end sleep interval limitation may be received via one or more of a standardized network management protocol, a non-standardized network management protocol, audio video bridging (AVB), stream reservation protocol (SRP), resource reservation protocol (RSVP) and simple network management protocol (SNMP). The time limit for the energy efficient networking sleep interval may be determined based on a number of hops between endpoint devices. One or more packets may be inspected by the network device to determine a type of data carried by the packets and/or to identify information related to end-to-end sleep interval limitation. The time limit for the energy efficient networking sleep interval may be determined based on latency requirements of one or more streams of data handled by the network device. The time limit for a specified port within the network device may be determined based on sleep time limits for one or more data streams communicated via the port. The network device may be statically and/or dynamically configured for operating utilizing the time limit for the energy efficient networking sleep interval. In this regard, the network device may be configured via a network management interface. In this manner, end-to-end sleep time intervals may be managed across a network.

Figure 1:
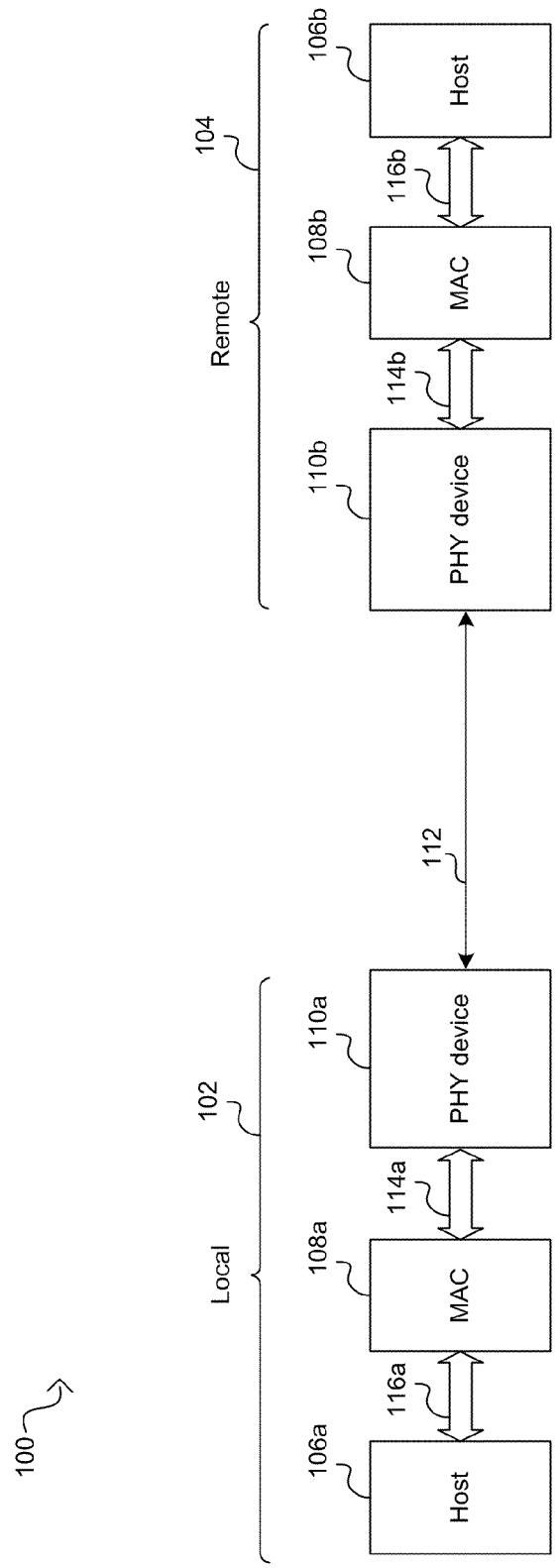
FIG. 1 is a diagram illustrating an exemplary network that may be operable to utilize energy efficient networking sleep time intervals based on end-to-end network sleep limitations, in accordance with an embodiment of the invention.

FIG. 1 is a diagram illustrating an exemplary network that may be operable to utilize energy efficient networking sleep time intervals based on end-to-end network sleep limitations, in accordance with an embodiment of the invention. Referring to FIG. 1, there is shown a system 100 that comprises a network device 102 and a network device 104. In addition, there is shown two hosts 106a and 106b, two medium access (MAC) controllers 108a and 108b, a PHY device 110a and a PHY device 110b, interfaces 114a and 114b, bus controller interfaces 116a and 116b and a link 112.

The network devices 102 and 104 may be link partners that may communicate via the link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as Infiniband, Ribbon and backplane may be utilized. With regard to optical media for the Ethernet link 112, single mode fiber as well as multi-mode fiber may be utilized. In various embodiments of the invention, one or both of the network devices 102 and 104 may be operable to comply with one or more standards based on IEEE 802.3, for example, 802.3az.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

The network device 102 may comprise a host 106a, a medium access control (MAC) controller 108a and a PHY device 110a. The network device 104 may comprise a host 106b, a MAC controller 108b, and a PHY device 110b. The PHY device(s) 110a and/or 110b may be pluggable transceiver modules or may be an integrated PHY device. Notwithstanding, the invention is not limited in this regard. In various embodiments of the invention, the network device 102 and/or 104 may comprise, for example, a network switch, a router, computer systems or audio/video (A/V) enabled equipment. In this regard, A/V equipment may, for example, comprise a microphone, an instrument, a sound board, a sound card, a video camera, a media player, a graphics card, or other audio and/or video device. The network devices 102 and 104 may be enabled to utilize Audio/Video Bridging and/or Audio/video bridging extensions (collectively referenced herein as audio video bridging or AVB) for the exchange of multimedia content and associated control and/or auxiliary data. Furthermore, the network devices 102 and/or 104 may be operable to communicate utilizing one or more IEEE 802.1 standard protocols and/or procedures and/or variations of and/or extensions thereof.

The PHY device 110a and the PHY device 110b may each comprise suitable logic, circuitry, interfaces and/or code that may enable communication, for example, transmission and reception of data, between the network device 102 and the network device 104. The PHY device(s) 110a and/or 110b may comprise suitable logic, circuitry, interfaces and/or code that may provide an interface between the network device(s) 102 and/or 104 to an optical and/or copper cable link 112.

The PHY device 110a and/or the PHY device 110b may be operable to support, for example, Ethernet over copper, Ethernet over fiber, and/or backplane Ethernet operations. The PHY device 110a and/or the PHY device 110b may enable multi-rate communications, such as 10 Mbps, 100 Mbps, 1000 Mbps (or 1 Gbps), 2.5 Gbps, 4 Gbps, 10 Gbps, 40 Gbps or 100 Gbps for example. In this regard, the PHY device 110a and/or the PHY device 110b may support standard-based data rate limits and/or non-standard data rate limits. Moreover, the PHY device 110a and/or the PHY device 110b may support standard Ethernet link lengths or ranges of operation and/or extended ranges of operation. The PHY device 110a and/or the PHY device 110b may enable communication between the network device 102 and the network device 104 by utilizing a link discovery signaling (LDS) operation that enables detection of active operations in the other network device. In this regard the LDS operation may be configured to support a standard Ethernet operation and/or an extended range Ethernet operation. The PHY device 110a and/or the PHY device 110b may also support auto-negotiation for identifying and selecting communication parameters such as speed and duplex mode.

The PHY device 110a and/or the PHY device 110b 10b may comprise a twisted pair PHY capable of operating at one or more standard rates such as 10 Mbps, 100 Mbps, 1 Gbps, and 10 Gbps (10BASE-T, 100GBASE-TX, 1 GBASE-T, and/or 10GBASE-T); potentially standardized rates such as 40 Gbps and 100 Gbps; and/or non-standard rates such as 2.5 Gbps and 5 Gbps. The PHY device 110a and/or the PHY device 110b may comprise a backplane PHY capable of operating at one or more standard rates such as 10 Gbps (10GBASE-KX4 and/or 10GBASE-KR); and/or non-standard rates such as 2.5 Gbps and 5 Gbps. The PHY device 110a and/or the PHY device 110b may comprise a optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The PHY device 110a and/or the PHY device 110b may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

In various embodiments of the invention, the PHY device 110a and/or the PHY device 110b may comprise suitable logic, circuitry, and/or code that may enable transmission and/or reception at a high(er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates.

The data transmitted and/or received by the PHY device 110a and/or the PHY device 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The hosts 106a and 106b may implement layer 3 and above, the MAC controllers 108a and 108b may implement layer 2 and above and the PHY device 110a and/or the PHY device 110b may implement the operability and/or functionality of layer 1 or the physical layer. In this regard, the PHY device 110a and/or the PHY device 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY device 110a and/or the PHY device 110b. During transmission, a device implementing a layer function may add its own header to the data passed on from the interfacing layer above it. However, during reception, a compatible device having a similar OSI stack may strip off the headers as the message passes from the lower layers up to the higher layers.

The PHY device 110a and/or the PHY device 110b may be configured to handle physical layer requirements, which include, but are not limited to, packetization, data transfer and serialization/deserialization (SERDES), in instances where such an operation is required. Data packets received by the PHY device 110a and/or the PHY device 110b from MAC controllers 108a and 108b, respectively, may include data and header information for each of the six functional layers above the PHY layer. The PHY device 110a and/or the PHY device 110b may be configured to encode data packets that are to be transmitted over the link 112 and/or to decode data packets received from the link 112.

In various embodiments of the invention, the hosts 106a and/or 106b may be operable to communicate control information with the PHY devices 110a and/or 110b via an alternate path. For example, the host 106a and/or the host 106b may be operable to communicate via a general purpose input output (GPIO) and/or a peripheral component interconnect express (PCI-E).

The MAC controller 108a may comprise suitable logic, circuitry, and/or code that may enable handling of data link layer, layer 2, operability and/or functionality in the network device 102. Similarly, the MAC controller 108b may comprise suitable logic, circuitry, and/or code that may enable handling of layer 2 operability and/or functionality in the network device 104. The MAC controllers 108a and 108b may be configured to implement Ethernet protocols, such as those based on the IEEE 802.3 standards, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. For example, the interface 114 may comprise a control interface such as a management data input/output (MDIO) interface. Furthermore, the interfaces 114a and 114b may comprise multi-rate capable interfaces and/or media independent interfaces (MII). For example, the interfaces 114a and/or 114b may comprise a media independent interface such as a XGMII, a GMII, or a RGMII for communicating data to and/or from the PHY device 110a. In this regard, the interface 114 may comprise a signal to indicate that data from the MAC controller 108a to the PHY device 110a is imminent on the interface 114a. Such a signal is referred to herein as a transmit enable (TX_EN) signal. Similarly, the interface 114a may utilize a signal to indicate that data from the PHY 110a to the MAC controller 108a is imminent on the interface 114a. Such a signal is referred to herein as a receive data valid (RX_DV) signal. The interfaces 114a and/or 114b may be configured to utilize a plurality of serial data lanes for sending and/or receiving data. The bus controller interfaces 116a and 116b may correspond to PCI or PCI-X interfaces. Notwithstanding, the invention is not limited in this regard.

In operation, one or both network devices 102 and 104 may comprise suitable logic, circuitry, interfaces, and/or code that may be operable to implement one or more energy efficient networking techniques, for example, energy efficient Ethernet (EEE) techniques in accordance with IEEE 802.3az. In this regard, the PHY device 110a and/or the PHY device 110b may be operable to support a low(er) power mode of operation based on, for example, low power idle (LPI), sub-rating, and/or subset PHY techniques. The LPI may generally refer to a family of techniques utilized during periods of low link utilization in one or more channels where, instead of transmitting conventional IDLE symbols via an Ethernet link, the PHY device 110a and/or the PHY device 110b may enter an energy savings mode. In this regard, during the energy savings mode, the PHY device 110a and/or the PHY device 110b may remain silent and/or may communicate signals other than conventional IDLE symbols in order to synchronize link partners and/or refresh circuitry. Sub-rating and/or subset PHY may generally refer to a family of energy saving techniques where one or more channels of a PHY device may be reconfigurable, in real-time or near real-time, to communicate at different data rates. In this regard, one or more channels of a link may remain active wherein a data rate limit the channels may be controlled by adjusting a signal constellation, PAM levels, an IFG, and/or a symbol rate.

A control policy may be utilized to control active modes and/or low(er) power modes of operation, for example, sleep modes of operation. The control policy may determine a data rate for a low(er) power mode of operation, it may determine when to transition between various data rates and/or may determine when to transition between a silent mode and an active mode. For example, a time interval that may be needed for circuitry to wake-up from a sleep interval may be configured within a device and/or may be negotiated between link partners prior to entering a sleep mode. Although various aspects of the invention are described with regard to energy efficient Ethernet LPI, sub-rating and/or subset PHY techniques, the invention is not so limited and other energy efficient techniques may be implemented, for example, based on an energy efficient networking control policy.

In various embodiments of the invention, the network devices 102 and/or 104 may limit duration of a sleep time interval or a low(er) power mode interval for communication between the network devices 102 and/or 104. Moreover, the network devices 102 and/or 104 may be operable to utilize the specified sleep interval limitation with various other time intervals, such as, time to wake intervals specified by the IEEE 802.3az standard. In various embodiments of the invention, sleep limitations may be managed on a per stream basis and/or based on all types of streams handled by a network device.

Furthermore, in various exemplary embodiments of the invention, an energy efficient networking (EEN) control policy and/or portions of the control policy may be hosted by a network endpoint device and/or by a core or intermediate network device. For example, the EEN control policy in the endpoint device may be operable to manage aspects of end-to-end energy savings in an Ethernet network and/or end-to-end energy savings in a subset of network devices in an Ethernet network. For example, the control policy may be operable to regulate sleep time intervals in one or more network nodes across a network in order to optimize energy savings while meeting latency requirements of data transmitted via the one or more network nodes. In this regard, the network devices 102 and/or 104 may limit the duration of a sleep interval or low(er) power mode interval according to end-to-end control policy specifications. Moreover, the network devices 102 and/or 104 may be operable to utilize the specified sleep interval limitation with various other time intervals such as time to wake intervals specified by the IEEE 802.3az standard.

In various embodiments of the invention, one or more core network devices and/or a core network device and an endpoint device may be operable to host the control policy for a subset of network devices within a network. In this manner, the EEN control policy in a core network device may be operable to manage aspects of energy savings end to end among a subset of network devices in an Ethernet network.

Figure 2:
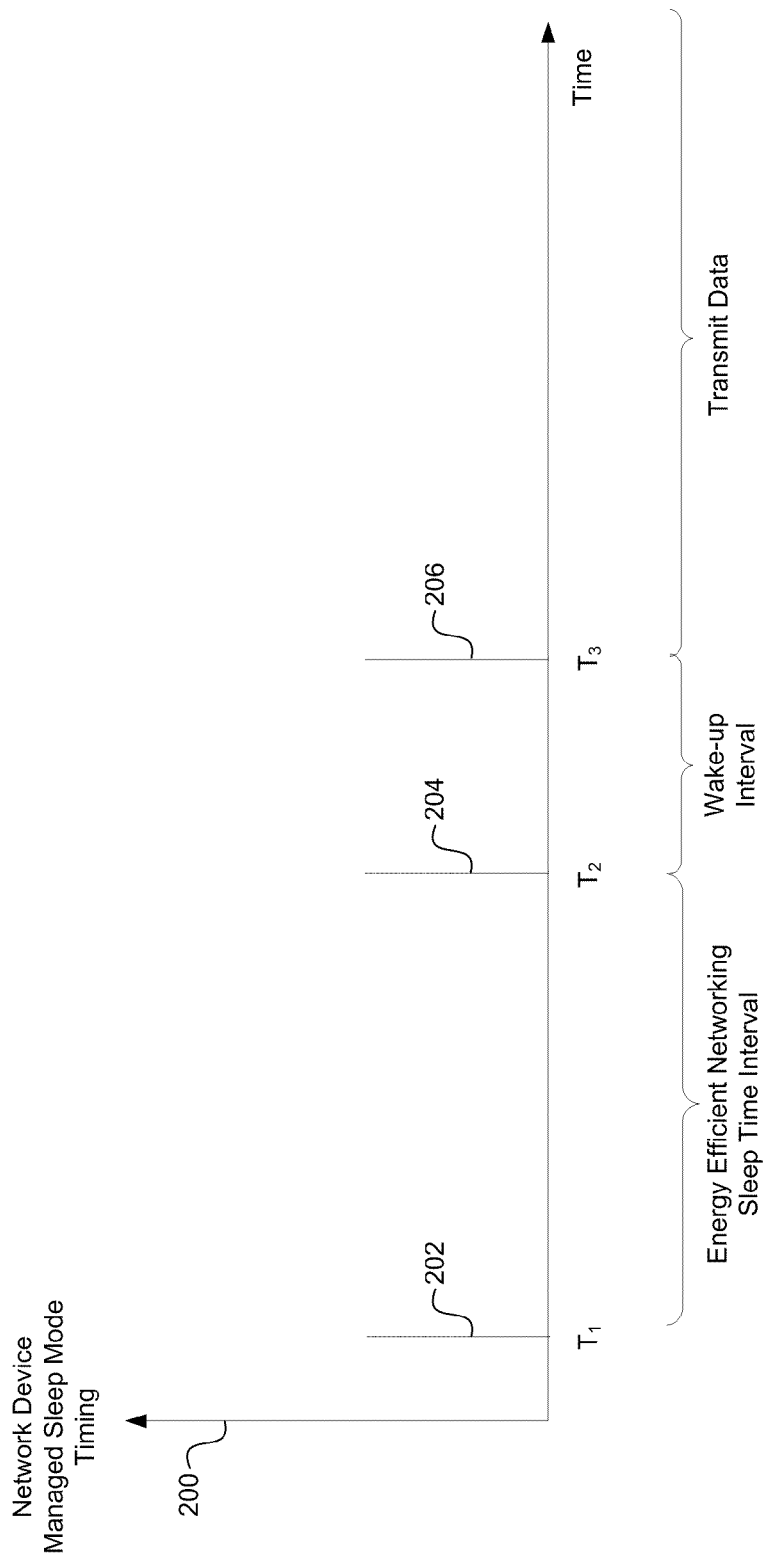
FIG. 2 is a diagram that illustrates an exemplary managed sleep time interval in a network device, in accordance with an embodiment of the invention.

FIG. 2 is a diagram that illustrates an exemplary managed sleep time interval in a network device, in accordance with an embodiment of the invention. Referring to FIG. 2, there is shown a time line 200 comprising three time instants T1 202, T2 204 and T3 206.

At the time instant T1 202, a transmitting network device, for example, the network device 102 described with respect to FIG. 1, may communicate to a link partner, for example, the network device 104 that the network device 102 is going to sleep on one or more channels in the transmit direction. At time instant T2 204, the network device 102 may communicate a wake-up signal to the network device 104. At time instant T3 206, the network device 102 may begin transmitting data to the network device 104. The time to wake interval between the wake-up signal at the time instant T2 204 and at the time instant T3 206, which is the time of transmission, may be configured in the network devices 102 and/or 104 prior to a communication session and/or it may be determined and/or adjusted for a particular sleep time interval based on negotiation between the network devices 102 and 104. Notwithstanding, the invention is not so limited.

In accordance with an embodiment of the invention, a sleep time interval in the network devices 102 and/or 104, which may occur between the time instants T1 202 and T2 204, may be limited in duration based on an energy efficient networking control policy. The energy efficient networking control policy may be hosted by an endpoint device or by one or more a intermediate or core network devices in a network. Moreover, the sleep time interval may be determined based on a type of traffic and/or latency requirements thereof, that may be communicated between endpoint devices. Moreover, the sleep time interval may be determined based on various resources, features and/or capabilities of one or more network devices and/or network nodes, for example, the network devices 102 and/or 104, that may process and/or route data between endpoint devices comprising the EEN control policy.

Figure 3:
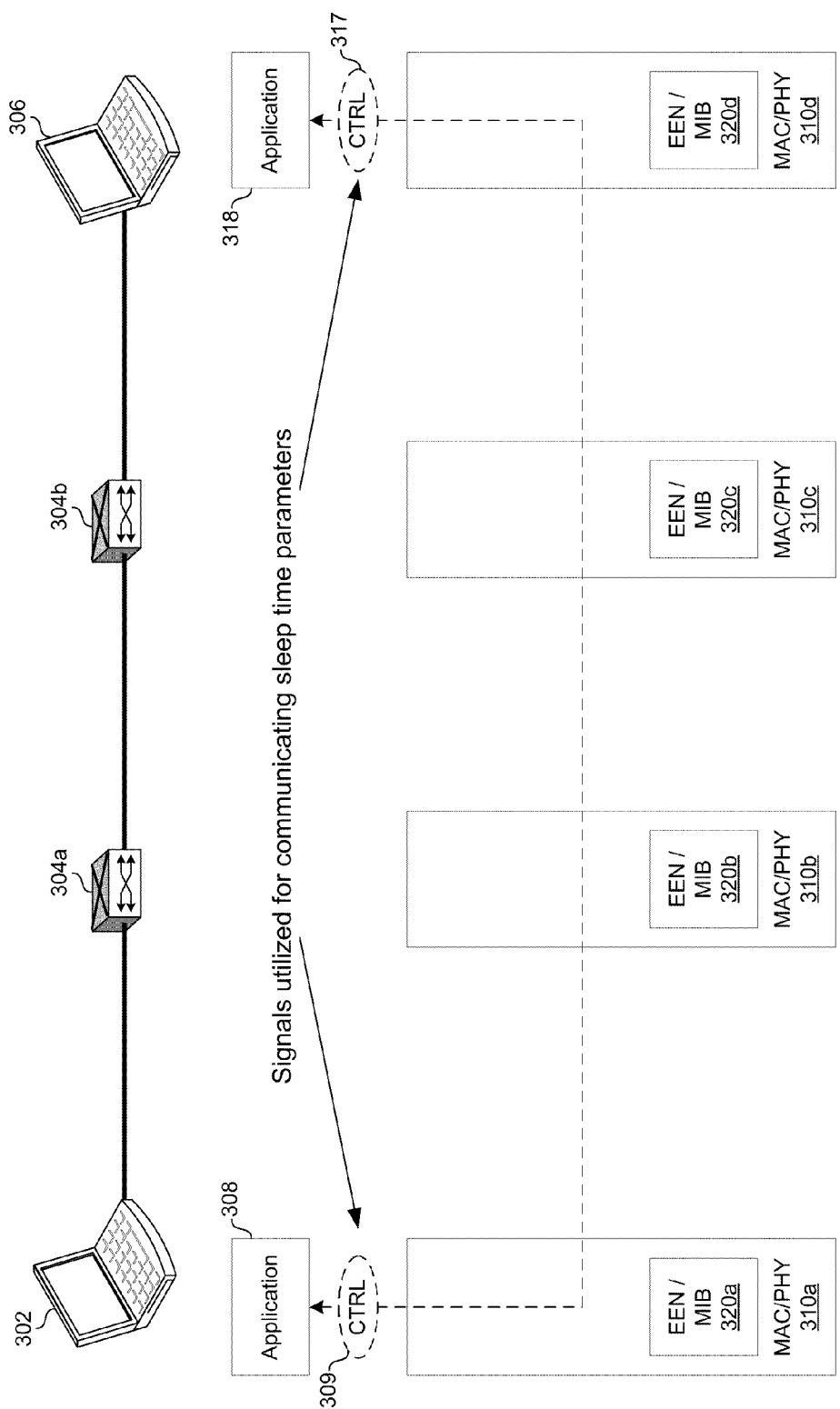
FIG. 3 is a block diagram illustrating an exemplary network that is operable to manage end-to-end sleep limitations utilizing a network management protocol, in accordance with an embodiment of the invention.

FIG. 3 is a block diagram illustrating an exemplary network that is operable to manage end-to-end sleep limitations utilizing a network management protocol, in accordance with an embodiment of the invention. Referring to FIG. 3 there is shown two endpoint devices 302 and 306 and two network devices 304a and 304b. The endpoint devices 302 and/or 304 and the network device 304a and/or 304b may each comprise MAC and/or PHY devices 310a, 310b, 310c and 310d respectively. The MAC and/or PHY devices 310a, 310b, 310c and 310d may be collectively referred to as the MAC and/or PHY devices 310. In addition, the two endpoint devices 302 and 306 and two network devices 304a and 304b each comprise a management information base (MIB) 210a, 210d, 210b and 210c respectively. In addition, there is shown the control messages 309 and 317.

One or more of the endpoint devices 302 and 306 and/or the network devices 304a and 304b may be similar and/or substantially the same as one or more of the network devices 102 and/or 104.

The endpoint devices 302 and/or 306 may be operable to communicate via the network devices 304a and 304b. In an exemplary embodiment of the invention, the endpoint device 306 may be a video server and the endpoint device 302 may request and/or receive streams of video data. Exemplary embodiments of the invention may comprise any suitable endpoint network devices 302 and 306, for example, the endpoint devices may comprise one or more laptops, portable phones, set top boxes, location devices, musical instruments, audio and/or video devices and/or gaming devices. For example, the endpoint devices 302 and/or 306 may comprise suitable logic, circuitry, interfaces and/or code to handle a voice over IP call via the network devices 304a and/or 304b.

The endpoint network devices 302 and 306 may be operable to manage end-to-end EEN communication via the network devices 304a and/or 304b utilizing one or more management interfaces. Alternatively, two core network devices or a core network device and an endpoint device may be operable to manage EEN communication, end to end, over a subset of network devices utilizing one or more management interfaces.

In an exemplary embodiment of the invention, when data is communicated from the endpoint network devices 306 to the endpoint device 302, sleep intervals may be controlled in one or more of the endpoint device 302, endpoint device 306 and/or the network devices 304a and 304b so that end-to-end latency does not exceed requirements of the data being communicated. For example, a network management protocol, such as simple network management protocol (SNMP) may be utilized to control communication and/or to communicate configuration parameters to one or more devices along a communication path. Furthermore, one or more variations of IEEE 802.1 standards and/or extensions thereof may be utilized to implement the one or more management interfaces. In various embodiments of the invention, one or more non-standardized management interfaces may be utilized. In this manner, one or more of the endpoint devices 302 and/or 306 may be operable to communicate EEN parameters, for example, maximum duration of a sleep time interval to one or more network nodes along a communication path between the endpoint devices.

One or more of the two endpoint devices 302 and 306 and two network devices 304a and 304b may comprise a management information base (MIB) 320a, 320d, 320b and/or 320c respectively. The MIB may enable management of various attributes of a device, for example, attributes of the MAC and/or PHY devices 310 and/or higher layer attributes. The MIB may comprise end-to-end sleep time limitation parameters as well as other network management information such as protocols supported by the MAC and/or PHY 310, an amount of time required for the MAC and/or PHY device 310 to transition between sleep and wake modes of operation and/or whether EEN is currently enabled or disabled in the MAC and/or PHY devices 310. Other parameters in the MIB 320 may comprise, for example, coefficients or other values for maintaining synchronization between network devices and data rates supported by the MAC and/or PHY devices 310. The EEN duration of sleep time parameters may be communicated to the MAC and/or PHY devices 310 in a plurality of ways. For example, sleep time limitation parameters may be manually configured and/or manually entered into a network device, for example, by a network administrator and/or may be programmable based on various events, software instructions and/or measurements. The network device may also be operable to utilize default sleep time parameters, which may be changed. Moreover, EEN parameters may be static, for example, one or more sleep time parameters may be determined prior to receiving data for transmission or EEN parameters may be dynamically modified. For example, the sleep interval duration parameters may be determined based on one or more types of traffic, traffic usage or patterns including current and past, traffic load, which are being handled by a network device and/or resource availability.

The endpoint devices 302 and/or 306 may comprise the applications 308 and 318 respectively. The applications 308 and 318 and/or the MAC and/or PHY devices 310 may be operable to exchange signals and/or messages 309 and/or 317 to enable end-to-end sleep limitations. Exemplary signals and/or messages 309 and/or 317 may comprise Ethernet frames, SNMP messages, LLDP data units, and/or physical layer signals. The signals and/or messages 309 and/or 317 may, for example, comprise an Ethernet frame with one or more bits or fields set to indicate that it is an EEN control message. For example, a unique Ethertype may indicate that it is an EEN control message and/or that it may comprise a sleep time interval. The signals and/or messages 309 and/or 317 may comprise sleep time parameters for the one or more of the network devices 304a and 304b and/or the endpoint devices 302 and/or 306. In various instances, the signals and/or messages 309 and/or 317 may be broadcast and/or multicast via a plurality of network devices along a communication path. A plurality of signals and/or messages may be communicated to different network devices. For example, the network device 304a may receive a different signal and/or message than the network device 304b. A signal and/or message sent to a first device, for example, the network device 304a, may trigger generation of a signal by the network device 304a to a second device, for example, 304b.

In operation, the endpoint device 302 and the endpoint device 306 may establish a VOIP call that may be communicated via the network devices 304a and/or 304b. In this regard, voice data that may be communicated between the endpoint device 302 and the endpoint device 306 may require a specified maximum end-to-end latency in order for end users on the VOIP call to experience good voice quality. The specified maximum end-to-end latency may indicate a maximum allowable end-to-end sleep time for one or more network devices handling the VOIP call. The endpoint devices 302 and/or 306 may manage sleep time intervals in one or more communication devices 304a and/or 304b, for example, along a communication path between the endpoint devices. For example, the endpoint device 302 may communicate end-to-end sleep time intervals information to the devices 304a and/or 304b for the VOIP data communicated from the endpoint device 302 to the endpoint device 306. On the other hand, the endpoint device 306 may manage the end-to-end sleep time intervals in the devices 304a and/or 304b for VOIP data communicated from the endpoint device 306 to the endpoint device 302. The network devices 304a and/or 304b may also modify sleep time based on resource availability and/or requirements of other traffic that may be handled during the VOIP call. In this manner, management of the end-to-end sleep time rather than management by each network device of its own internal sleep time, may improve voice quality in VOIP phone calls. Moreover, having knowledge of sleep time intervals may enable receiving devices to transition circuitry for higher OSI layers into and/or out of a sleep mode in addition to transitioning MAC and/or PHY devices into and/or out of a sleep mode. U.S. patent application Ser. No. 12/571,208, which was filed on Sep. 30, 2009, discloses end-to-end management of energy efficient networking protocols and is hereby incorporated herein by reference in its entirety.

Figure 4:
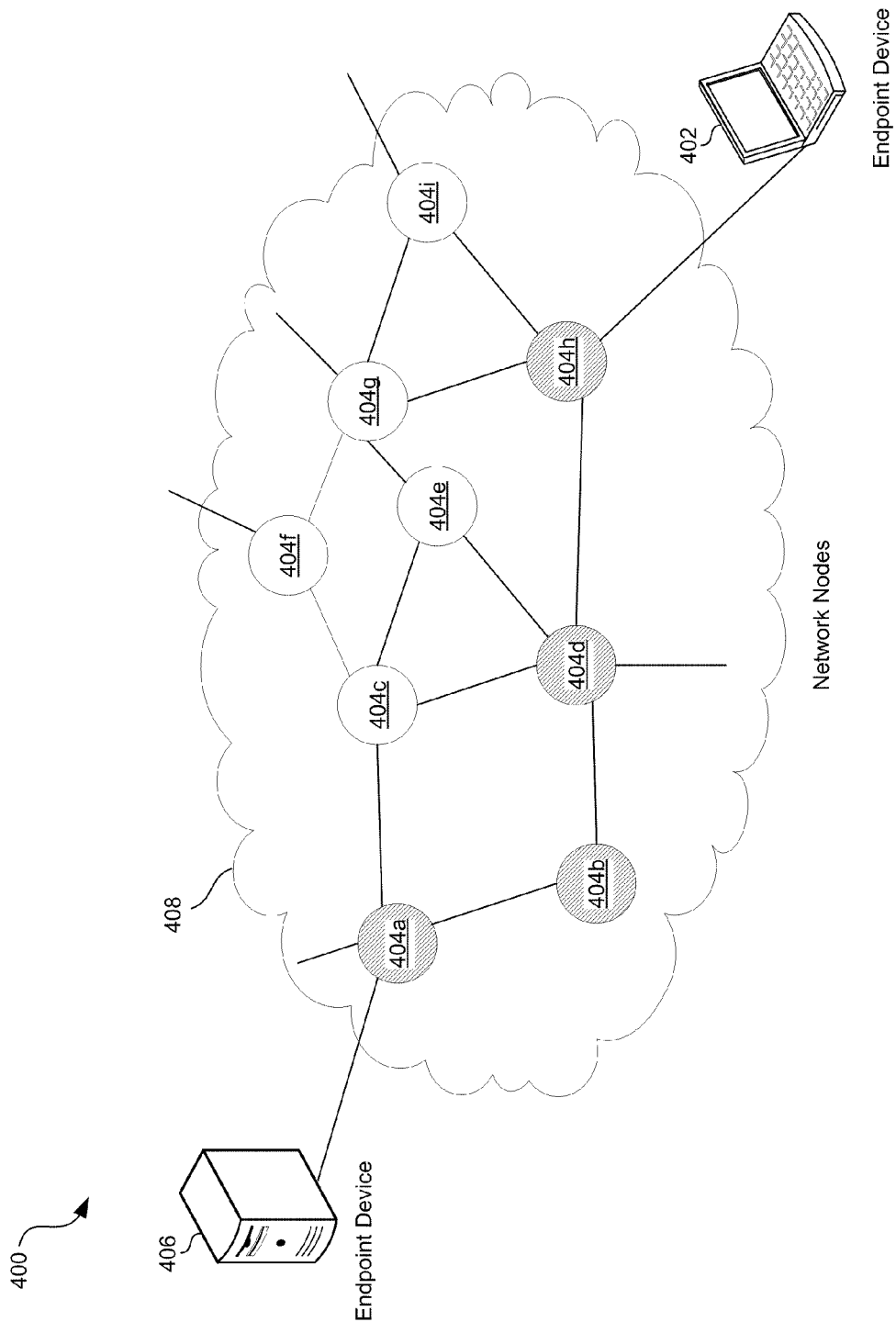
FIG. 4 is a block diagram illustrating an exemplary network that is operable to manage end-to-end sleep limitations, in accordance with an embodiment of the invention.

FIG. 4 is a block diagram illustrating an exemplary network that is operable to manage end-to-end sleep limitations, in accordance with an embodiment of the invention. Referring to FIG. 4 there is shown, a system 400 comprising a network 408, endpoint devices 402 and 406 and network devices 404a, 404b, . . . , 404i.

One or more of the endpoint devices 402 and 406 and/or one or more of the network devices 404a, 404b, . . . , 404i may be similar and/or substantially the same as one or more of the network devices 102 and/or 104 described with respect to FIG. 1. Furthermore, one or more of the endpoint devices 402 and 406 may be similar and/or substantially the same as one or more of the endpoint devices 302 and 306 and/or one or more of the network devices 404a, 404b, . . . , 404i may be similar and/or substantially the same as one or more of the network devices 304a and 304b described with respect to FIG. 3.

The endpoint devices 402 and/or 406 may comprise suitable logic, circuitry, interfaces and/or code that may be operable to determine sleep time limitations for one or more network devices 404a, 404b, . . . , 404i that may handle traffic communicated between the endpoint devices 402 and/or 406. For example, the endpoint devices may be operable to determine an allowable end-to-end latency for one or more data streams that may be communicated between the endpoint devices 402 and 406. The end-to-end allowable latency may be utilized to determine an allowable end-to-end sleep time for one or more of the network devices 404a, 404b, . . . , 404i. For example, a specified end-to-end sleep time interval may be allowed for a plurality of network devices across the network 408. The endpoint devices 402 and/or 406 may allocate portions of the end-to-end allowable sleep time to one or more of the network devices 404a, 404b, . . . , 404i. In this regard, the endpoint devices 402 and/or 406 may utilize a maximum number of hops within the network 408 to determine and/or allocate a portion of the end-to-end sleep time to one or more of the network devices 404a, 404b, . . . , 404i. In various embodiments of the invention, sleep limitations may be managed on a per stream basis and/or based on all types of streams handled by a network device.

In various embodiments of the invention, one or more of the endpoint devices 402 and 406 and/or one or more of the network devices 404a, 404b, . . . , 404i may be configured to communicate based on one or more communication protocols that may enable determining and/or reserving a communication path prior to communicating a stream of data. For example, one or more of IEEE 802.1AS audio video bridging (AVB), IEEE 802.1Q at stream reservation protocol (SRP) and/or RSVP, for example, may be utilized for communication with end-to-end sleep time constraints. In this regard, as one or more network devices 404a, 404b, . . . , 404i may be discovered and/or determined to be utilized in a communication path between the endpoint devices 402 and 406, sleep time interval constraints may be communicated to the devices. U.S. patent application Ser. No. 11/963,017, which was filed on Dec. 21, 2007 and U.S. patent application Ser. No. 11/963,087, which was filed on Dec. 21, 2007 discloses SPB and/or AVB routing protocols, and are each hereby incorporated herein by reference in its entirety.

In various embodiments of the invention, the endpoint devices 402 and/or 406 may be operable to modify packet headers and/or insert tags among headers for one or more OSI layer protocols to indicate sleep time interval duration information to one or more network devices within the network 408. In this regard, the one or more network devices within the network 408 may be operable to parse headers and/or inspect one or more OSI layers of header data to determine the sleep time interval duration information. In this manner, sleep time interval duration may be determined based on a type of traffic and/or latency requirements of traffic. Network devices within the network 408 may inspect packets for sleep time limit information and/or for a type of data that may be comprised within a packet. For example, the network devices may determine that the packets are part of a VOIP stream. The network devices within the network 408 may be programmed to enable a specified maximum sleep time when handling VOIP data, for example.

In various embodiments of the invention, wherein the network 408 may be managed by a network administrator, the network administrator may manually configure sleep time constraint parameters in one or more of the network devices within the network 408.

In operation, an application running on the endpoint device 402 may exchange, or trigger an exchange of messages with the endpoint device 406 to determine a path between the endpoint devices. Path discovery may comprise identifying the nodes 404a, 404b, 404d and 404h for delivery of a specified data stream and/or determining whether the identified network devices are operable to support EEN end-to-end sleep time constraints. For example, the endpoint devices 402 and/or 406 may be operable to implement one or more AVB protocols. Furthermore, the endpoint devices 402 and/or 406 may determine the path by exchanging messages in accordance IEEE 802.1Q at—IEEE Standard for Local and Metropolitan Area Networks: Virtual Bridged Local Area Networks—Amendment 9: Stream Reservation Protocol (SRP), for example.

Subsequent to determining the path between the endpoint devices 402 and/or 406, the application may generate one or more messages or signals to configure EEN sleep time duration parameters in the identified network devices 404a, 404b, 404d and 404h. The one or more messages and/or signals may comprise a unique Ethertype and/or other unique and/or identifiable frame format that may be utilized to configure parameters in devices along a network path. In this regard, the network devices 404a, 404b, 404d and 404h may inspect received packets to determine EEN sleep time parameter information. Upon discovering the unique and/or identifying Ethertype and/or frame formatting, the EEN sleep time parameter information may be extracted and local parameters may be updated based on the extracted EEN sleep time parameter information.

Figure 5:
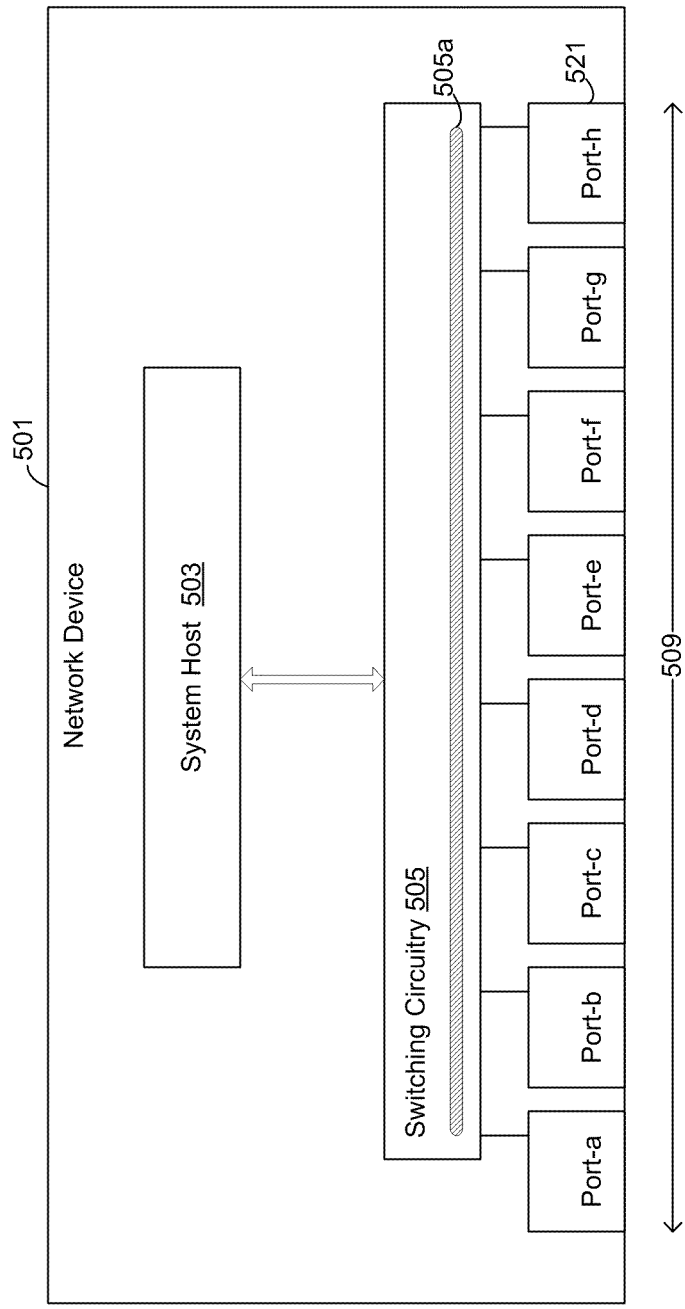
FIG. 5 is a block diagram illustrating an exemplary network device that is operable to manage end-to-end sleep limitations for a plurality of packet streams, in accordance with an embodiment of the invention.

FIG. 5 is a block diagram illustrating an exemplary network device that is operable to manage end-to-end sleep limitations for a plurality of packet streams, in accordance with an embodiment of the invention. Referring to FIG. 5, there is shown a network device 501, a host 503, a switching circuitry 505, and a plurality of ports 509.

The network device 501 may be similar and/or substantially the same as one or more of the network devices 102 and/or 104 described with respect to FIG. 1, may be similar and/or substantially the same as one or more of the network devices 304a and 304b described with respect to FIG. 3 and/or may be similar and/or substantially the same as one or more of the network devices 404a, 404b, . . . , 404i described with respect to FIG. 4.

The network device 501 may comprise switch fabric that may be operable to perform switching operations in a network, for example, in the network 408 described with respect to FIG. 4. The network device 501 may comprise, for example, the host 503, the switching circuitry 505 and the plurality of ports 509. Furthermore, the network device 501 may comprise suitable logic, circuitry, interfaces and/or code that may enable performing various switching related operations. In this regard, the network device 501 may be operable to receive network traffic from an endpoint device directly, for example, the endpoint device 402 and/or 406 and/or from one or more intermediate network nodes, for example, the network devices 404a, 404b, . . . , 404i. The network device 501 may receive the network traffic via any of the plurality of ports 509 and may forward the traffic via one or more of the plurality of ports 509 to one or more other endpoint devices and/or to one or more other intermediate networks devices. For example, the network switching device 501 may be operable to route network traffic received via port-a 511 to network devices that may be reachable or accessible via port-h 521. In various embodiments of the invention, the network device 501 may be operable to enter and/or exit a sleep mode based on energy efficient Ethernet networking. Furthermore the network device 501 may be operable to implement sleep time limitations for communication between a pair of network devices and/or among a plurality of network devices configured for end-to-end sleep time limitations.

The host 503 may comprise suitable logic, circuitry, interfaces and/or code that may be operable to perform control and/or management operations in the network switching device 501. The host 503 may comprise, for example, a general purpose processer or an application-specific integrated circuit (ASIC) configurable and/or operable to provide control and/or management messaging and/or processing in the network switching device 501. The host 503 may be utilized, for example, to set up and/or manage operations of each of the ports in the plurality of ports 509, to setup, control, and/or manage operations of the switching circuitry 505, to setup, monitor, and/or manage switching paths within the network switching device 501, and/or to maintain and/or manage addressing information that may be utilized during packet processing operations. Furthermore, the host 503 may determine sleep time intervals for one or more of the ports 509.

The switching circuitry 505 may comprise suitable logic, circuitry, interfaces and/or code that may be operable to route traffic among the plurality of ports 509 via one or more wired links. The switching circuitry 505 may be utilized, for example, to enable communication of packets received via any of the plurality of ports 509, from a sending network node, to one or more receiving network nodes via one or more ports in the plurality of ports 509. The switching circuitry 505 may comprise, for example, a bus subsystem 505a, which may comprise suitable logic, circuitry, interfaces and/or code that may be operable to exchange data and/or messaging among a plurality of components and/or entities via a plurality of physical interconnects, based on one or more interfaces, comprising, for example, PCI and/or I$^2$C. The bus subsystem 505a may be operable in the network switching device 501 to facilitate data transfers among components of the fabric switch 501, including the plurality of ports 509.

The plurality of ports 509 may comprise suitable logic, circuitry, interfaces and/or code that may be operable to provide external network interfacing functionality, in the network switching device 501, based on one or more networking standards and/or protocols that are described with respect to FIG. 1.

In operation, the network device 501 may receive packets corresponding to a plurality of data streams via one or more of the plurality of ports 509 from one or more of a plurality of sending network devices. The received packets may be processed to determine addressing information. For example, headers may be parsed to determine source and/or destination addressing information. Furthermore, the packets may be inspected to determine EEN sleep time limitation parameters corresponding to one or more of the plurality of data streams. Once destination nodes are determined, based on routing tables maintained in the host 503, for example, a corresponding port or ports for forwarding the received packets may be determined. Once the appropriate port or ports are determined, the switching circuitry 505 may be utilized to transfer the traffic packets from the receiving ports to the transmitting ports. For example, where the switching circuitry 505 comprises a bus subsystem, the processed received traffic packets may be transferred from and/or to the ports via bus interfaces. The data transfer via the switching circuitry 505 may be managed by the host 503.

The host 503 may be operable to determine sleep time intervals for the plurality of ports 509, for example, the port-h 521. In this regard, the host 503 may be operable to switch packets that may be received via a plurality of the ports 509, to the port-h 521. The received packets may comprise various types of data, for example, video stream data, VOIP data and/or web browsing data. The host 503 may be operable to determine a port-h 521 maximum duration of a sleep time interval based on the various types of received data. For example, the sleep time interval may be limited by latency requirements of the various types of received data. In this regard, the host 503 may limit sleep time intervals on the port-h 521 based on the lowest latency requirement and/or the shortest allowed sleep time interval of the various types of received data. For example, a sleep time interval corresponding to the voice over IP data may be constrained to the shortest duration relative to the video data and/or the web browsing data. Hence, the sleep time interval corresponding to the voice over IP data may be utilized to limit sleep time for the port-h 521.

Figure 6:
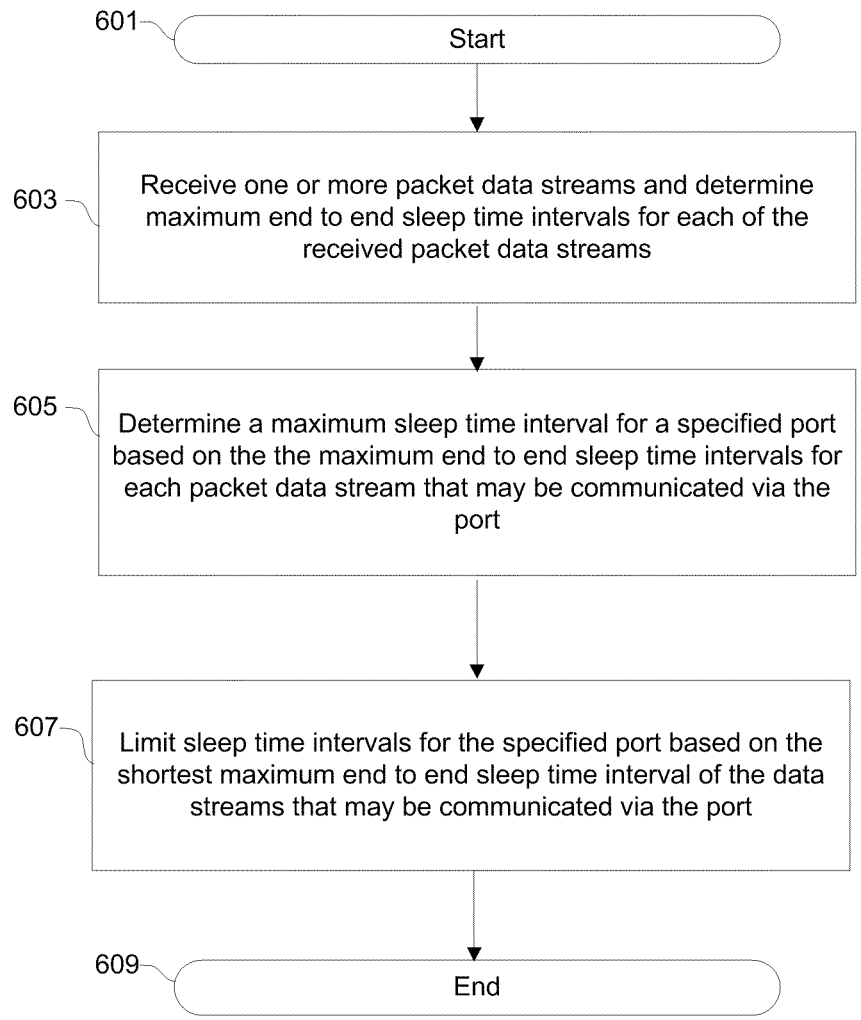
FIG. 6 is a flow chart illustrating exemplary steps for managing end-to-end sleep limitations in an Ethernet network, in accordance with an embodiment of the invention.

FIG. 6 is a flow chart illustrating exemplary steps for managing end-to-end sleep limitations in an Ethernet network, in accordance with an embodiment of the invention. Step 601, is a start step. In step 603, one or more packet data streams may be received, for example, by the network device 401*a* and a maximum end-to-end sleep time interval may be determined for each of the received packet data streams. In step 605, a maximum sleep time interval for a specified port, for example, the port-h 521 may be determined based on the maximum end-to-end sleep time intervals of each packet data stream that may be communicated via the port-h 521. In step 607, sleep time intervals may be limited for the specified port-h 521 based on the shortest maximum end-to-end sleep time interval of the data streams that may be communicated via the port-h 521. Step 609, is the end of exemplary steps.

In one embodiment of the invention, a network device 404*a* may be operable to determine a time limit for an energy efficient networking sleep interval, for example, the time interval between time instants T1 and T2, which are described with respect to FIG. 2, based on an end-to-end sleep interval limitation. The time limit may be communicated to one or more other network devices, for example, the network devices 404*b* and/or 404*c*. The communicated time limit may limit an energy efficient networking sleep interval duration for the one or more other network device, for example, 404*b* and/or 404*c*. Information may be received by the network device 404*a* based on the end-to-end sleep interval limitation via one or more of user input, packet header information and a network management protocol. Furthermore, information based on the end-to-end sleep interval limitation may be received via one or more of a standardized network management protocol, for example, SNMP, a non-standardized network management protocol, audio video bridging (AVB), stream reservation protocol (SRP), resource reservation protocol (RSVP) and simple network management protocol (SNMP).

The time limit for the energy efficient networking sleep interval may be determined based on a number of hops between endpoint devices, for example, the four hops comprising 404*a*, 404*b*, 404*d* and 404*h* between the endpoint devices 402 and 406. One or more packets may be inspected by the network device to determine a type of data of the packets and/or to identify information related to end-to-end sleep interval limitation. The time limit for the energy efficient networking sleep interval may be determined based on latency requirements of one or more streams of data handled by the network device. The time limit for a specified port within the network device, for example, the port 521 in the network device 501 may be determined based on sleep time limits for one or more data streams communicated via the port. The network device 404*a* may be statically and/or dynamically configured for operating utilizing the time limit for the energy efficient networking sleep interval. In this regard, the network device 404*a* may be configured via a network management interface, for example, an SNMP interface. In this manner, end-to-end sleep time intervals may be managed across a network.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for management based end-to-end sleep limitation in an energy efficient Ethernet network.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
performing by one or more processors and/or circuits in an intermediate network switch node in a path between a first network node and a second network node, said intermediate network switch node including a plurality of ports that are coupled to a plurality of network nodes via a corresponding plurality of network cables:
receiving an energy efficiency configuration message within said intermediate network switch node, said energy efficiency configuration message originating at said first network node and destined to said second network node and including information that enables identification of a sleep interval duration for a connection between said first network node and said second network node; and
configuring an energy saving operation of a first of said plurality of ports that couples said first network node to said intermediate network switch and a second of said plurality of ports that couples said second network node to said intermediate network switch based on the same received energy efficiency configuration message, wherein said configuration of said energy saving operation of said first of said plurality of ports and said second of said plurality of ports in said intermediate network switch node limits an amount of time that said first of said plurality of ports and said second of said plurality of ports remain in a sleep state after transitioning from an active state to accommodate a type of traffic and/or latency requirements for an application supported by one of said first network node and said second network node.

2. The method of claim 1, further comprising inspecting, by said intermediate network switch node, one or more packets to identify information related to said sleep interval limitation.

3. The method of claim 2, wherein said inspecting comprises inspecting a packet header.

4. A method for networking, comprising:
performing by one or more circuits in a network device:
determining a time limit for an energy efficient networking sleep interval based on a type of traffic and/or latency requirements of traffic between a first endpoint device and a second endpoint device in a network, a communication path between said first endpoint device and said second endpoint device including an intermediate network switch node, said intermediate network switch node including a plurality of ports that are coupled to a plurality of network nodes via a corresponding plurality of network cables, a first of said plurality of ports in said communication path coupling said first endpoint device to said intermediate network switch node and a second of said plurality of ports in said communication path coupling said second endpoint device to said intermediate network switch node; and
communicating a message that enables determination of said determined time limit for said energy efficient networking sleep interval to said intermediate network switch node via said first of said plurality of ports, wherein the same communicated message is used to configure an amount of time that said first of said plurality of ports and said second of said plurality of ports in said intermediate network switch node remain in a sleep state after transitioning from an active state.

5. The method of claim 4, wherein said communicating comprises communicating via a data packet.

6. The method of claim 4, wherein said communicating comprises communicating via packet header information.

7. The method of claim 4, wherein said communicating comprises communicating via a network management protocol.

8. The method of claim 4, wherein said time limit for said energy efficient networking sleep interval is determined based on a number of hops between endpoint devices.

9. A system for networking, the system comprising:
one or more circuits in a network device, wherein said one or more circuits are operable to:
determine a limitation relating to an energy efficient networking sleep interval based on a type of traffic and/or latency requirements of traffic between a first endpoint device and a second endpoint device in a network, a communication path between said first endpoint device and said second endpoint device including an intermediate network node that includes a plurality of ports that are coupled to a plurality of network nodes via a corresponding plurality of network cables, a first of said plurality of ports in said communication path coupling said first endpoint device to said intermediate network node and a second of said plurality of ports in said communication path coupling said second endpoint device to said intermediate network node; and
communicate a configuration message based on said determined limitation to said intermediate network node via said first of said plurality of ports, wherein the same communicated configuration message enables a limiting of a time interval of a sleep state of a component of said first of said plurality of ports and said second of said plurality of ports in said intermediate network node, while a time interval of a sleep state of a component of a third of said plurality of ports in said intermediate network node that is not part of said communication path is left unchanged.

10. The system of claim 9, wherein said time limit is communicated via a data packet.

11. The system of claim 9, wherein said time limit is communicated via packet header information.

12. The system of claim 9, wherein said time limit is communicated via a network management protocol.

13. The system of claim 9, wherein said limitation for said energy efficient networking sleep interval is determined based on a number of hops between endpoint devices.

* * * * *

UNITED STATES PATENT AND TRADEMARK OFFICE
CERTIFICATE OF CORRECTION

PATENT NO. : 8,930,534 B2
APPLICATION NO. : 12/535172
DATED : January 6, 2015
INVENTOR(S) : Wael William Diab Page 1 of 1

It is certified that error appears in the above-identified patent and that said Letters Patent is hereby corrected as shown below:

In the claims,

Col. 16, line 53, replace "time limit" with --limitation--.

Col. 16, line 55, replace "time limit" with --limitation--.

Col. 16, line 57, replace "time limit" with --limitation--.

Signed and Sealed this
Twenty-first Day of April, 2015

Michelle K. Lee
*Director of the United States Patent and Trademark Office*